(12) United States Patent
Kitakata et al.

(10) Patent No.: US 9,919,668 B2
(45) Date of Patent: Mar. 20, 2018

(54) VEHICLE ENERGY ABSORPTION STRUCTURE AND ENERGY ABSORPTION MEMBER

(71) Applicant: TOYOTA JIDOSHA KABUSHIKI KAISHA, Toyota-shi, Aichi-ken (JP)

(72) Inventors: Shintaro Kitakata, Nissin (JP); Kouki Ikeda, Toyota (JP); Atsushi Mikuni, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 15/126,232

(22) PCT Filed: Mar. 23, 2015

(86) PCT No.: PCT/IB2015/000385
§ 371 (c)(1),
(2) Date: Sep. 14, 2016

(87) PCT Pub. No.: WO2015/145239
PCT Pub. Date: Oct. 1, 2015

(65) Prior Publication Data
US 2017/0080884 A1   Mar. 23, 2017

(30) Foreign Application Priority Data
Mar. 24, 2014   (JP) ................. 2014-060500

(51) Int. Cl.
*B60R 19/34* (2006.01)
*B60R 19/03* (2006.01)
*B62D 21/02* (2006.01)
*B62D 21/15* (2006.01)
*B62D 29/00* (2006.01)
*B62D 29/04* (2006.01)

(52) U.S. Cl.
CPC ............. *B60R 19/34* (2013.01); *B60R 19/03* (2013.01); *B62D 21/02* (2013.01); *B62D 21/152* (2013.01); *B62D 29/008* (2013.01); *B62D 29/041* (2013.01)

(58) Field of Classification Search
CPC .. Y02B 30/62; F24F 2203/026; F24F 5/0017; F25B 29/006; F25B 37/00; C07C 45/673; C07C 407/00; C07C 409/04; C07C 45/49; A61B 6/482
USPC ......................................... 293/133
See application file for complete search history.

(56) References Cited

U.S. PATENT DOCUMENTS 5,340,178 A   8/1994 Stewart et al.
6,601,886 B1  8/2003 Thayer
(Continued)

FOREIGN PATENT DOCUMENTS

DE   20 2009 017 015 U1   4/2011
EP          2 703 230 A1   3/2014
(Continued)

*Primary Examiner* — Kiran B Patel
(74) *Attorney, Agent, or Firm* — Oliff PLC

(57) ABSTRACT

A vehicle energy absorption structure includes an energy absorption member made of fiber reinforced resin. At least part, in a thickness direction, of that wall extending in a load input direction of the energy absorption member is provided with a plurality of discontinuous portions discontinued from each other in the load input direction, the plurality of discontinuous portions being arranged along the load input direction.

3 Claims, 6 Drawing Sheets

(56) References Cited

U.S. PATENT DOCUMENTS

| | | | | |
|---|---|---|---|---|
| 6,672,438 B2* | 1/2004 | Beck | B60R 19/34 | 188/377 |
| 8,684,451 B1* | 4/2014 | Park | B62D 25/082 | 296/203.02 |
| 2003/0052493 A1 | 3/2003 | Ponsonnaille et al. | | |
| 2003/0178861 A1* | 9/2003 | Wikstrom | B60R 19/34 | 293/133 |
| 2006/0290150 A1* | 12/2006 | Roll | B60R 19/18 | 293/133 |
| 2007/0182176 A1* | 8/2007 | Muskos | B60R 19/34 | 293/133 |
| 2008/0116719 A1* | 5/2008 | Bae | B60R 19/34 | 296/187.09 |
| 2009/0001737 A1* | 1/2009 | Salomonsson | B60R 19/34 | 293/133 |
| 2009/0026777 A1* | 1/2009 | Schmid | B60R 19/34 | 293/133 |
| 2009/0085362 A1* | 4/2009 | Terada | B60R 19/34 | 293/132 |
| 2009/0115208 A1* | 5/2009 | Kano | F16F 7/12 | 293/132 |
| 2009/0261602 A1* | 10/2009 | Karlander | B60R 19/34 | 293/132 |
| 2010/0066124 A1* | 3/2010 | Terada | B62D 21/152 | 296/187.09 |
| 2010/0133859 A1* | 6/2010 | Lutke-Bexten | B60R 19/18 | 293/102 |
| 2010/0164238 A1* | 7/2010 | Nakanishi | F16F 7/12 | 293/132 |
| 2011/0187135 A1* | 8/2011 | Kano | B60R 19/34 | 293/133 |
| 2011/0193369 A1 | 8/2011 | Wuest et al. | | |
| 2012/0098280 A1* | 4/2012 | Handing | B60R 19/34 | 293/118 |
| 2012/0119526 A1* | 5/2012 | Clausen | F16F 7/12 | 293/133 |
| 2013/0300139 A1* | 11/2013 | Fukawatase | B60R 19/36 | 293/133 |
| 2014/0062106 A1* | 3/2014 | Han | B60R 19/34 | 293/133 |
| 2014/0062107 A1* | 3/2014 | Kim | B60R 19/34 | 293/133 |
| 2014/0353990 A1* | 12/2014 | Ishitobi | B60R 19/34 | 293/133 |
| 2014/0361559 A1* | 12/2014 | Sakakibara | B60R 19/34 | 293/133 |
| 2015/0001866 A1* | 1/2015 | Noyori | F16F 7/125 | 293/133 |
| 2015/0035316 A1* | 2/2015 | Kuriyama | B62D 25/082 | 296/187.1 |
| 2015/0075680 A1* | 3/2015 | Tanaka | C22C 38/38 | 148/603 |
| 2015/0158442 A1* | 6/2015 | Yun | F16F 7/12 | 293/132 |
| 2015/0197206 A1* | 7/2015 | Tamura | B60R 19/34 | 293/133 |
| 2015/0232050 A1* | 8/2015 | Yamada | B60R 19/34 | 296/187.1 |
| 2015/0246651 A1* | 9/2015 | Muraji | B62D 21/152 | 296/187.1 |
| 2015/0307134 A1* | 10/2015 | Hirota | B62D 25/082 | 296/187.09 |
| 2015/0314743 A1* | 11/2015 | Matsushiro | B60R 19/023 | 293/133 |
| 2015/0343972 A1* | 12/2015 | Lee | B60R 19/34 | 293/133 |
| 2015/0360632 A1* | 12/2015 | Nishida | B62D 21/152 | 293/133 |
| 2015/0360633 A1* | 12/2015 | Nishida | B62D 21/152 | 293/133 |
| 2015/0360726 A1* | 12/2015 | Yuge | B62D 25/082 | 180/312 |
| 2016/0001725 A1* | 1/2016 | Nakanishi | B60R 19/34 | 293/133 |
| 2016/0101751 A1* | 4/2016 | Bou | B62D 21/152 | 293/133 |
| 2016/0121934 A1* | 5/2016 | Murayama | B62D 21/152 | 296/187.09 |
| 2017/0203707 A1* | 7/2017 | Fuerst | B60R 19/34 | |
| 2017/0210319 A1* | 7/2017 | Fuerst | B60R 19/023 | |

FOREIGN PATENT DOCUMENTS

| | | |
|---|---|---|
| FR | 2 829 083 A1 | 3/2003 |
| FR | 2 934 536 A1 | 2/2010 |
| JP | 2008-024084 A | 2/2008 |
| JP | 2008-221985 A | 9/2008 |
| JP | 2009-154587 A | 7/2009 |
| JP | 2011-530054 A | 12/2011 |

\* cited by examiner

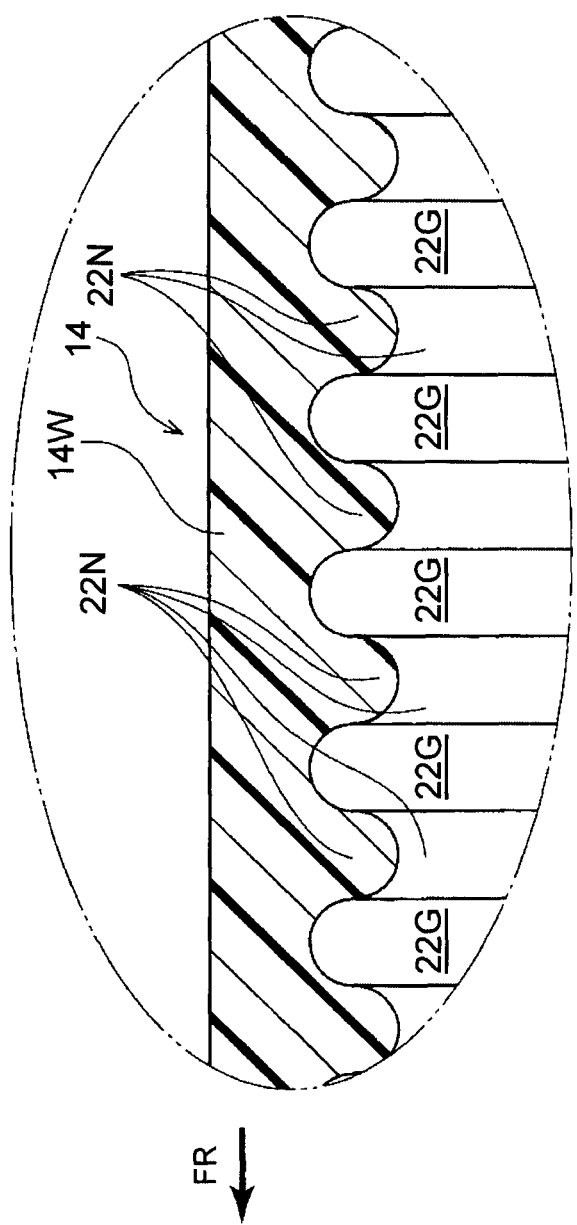

RELATED ART

VEHICLE ENERGY ABSORPTION STRUCTURE AND ENERGY ABSORPTION MEMBER

BACKGROUND OF THE INVENTION

1. Field of the Invention

The present invention relates to a vehicle energy absorption structure and an energy absorption member.

2. Description of Related Art

There has been known a crash box made of CFRP (e.g., see Japanese Patent Application Publication No. 2008-24084 (JP 2008-24084 A)).

In the meantime, energy absorption characteristics of a crash box made of fiber reinforced resin may be changed depending on a collision speed, and therefore, there is room for improvement from the viewpoint of performing stable energy absorption.

SUMMARY OF THE INVENTION

The present invention provides a vehicle energy absorption structure and an energy absorption member each of which is able to restrain a variation range of energy absorption characteristics due to a collision speed to be small.

A first aspect of the present invention relates to a vehicle energy absorption structure. The vehicle energy absorption structure includes an energy absorption member made of fiber reinforced resin. At least part, in a thickness direction, of that wall extending in a load input direction of the energy absorption member is provided with a plurality of discontinuous portions discontinued from each other in the load input direction. The plurality of discontinuous portions is arranged along the load input direction.

In the above aspect, when a collision load is input into the energy absorption member, the energy absorption member is compressed in the load input direction, so that collision energy is absorbed. Since the plurality of discontinuous portions is formed on the wall of the energy absorption member so as to be arranged along the load input direction, energy absorption characteristics are hard to change due to a collision speed.

Thus, in the above aspect, a variation range of the energy absorption characteristics due to the collision speed can be restrained to be small.

Note that the plurality of discontinuous portions may be constituted by a corrugated plate (layer) with a wall thickness direction being taken as an amplitude direction thereof (the corrugated plate constitutes at least part of the wall in a thickness direction). Further, for example, the plurality of discontinuous portions may be configured such that discontinuous portions of fibers forming the fiber reinforced resin (disconnecting portions of the fibers) in the wall are arranged at a predetermined interval in the load input direction. Further, for example, the plurality of discontinuous portions may be configured such that a fiber forming the fiber reinforced resin is oriented in a wave form (a winding path shape) at a predetermined cycle so that the wall thickness direction becomes the amplitude direction.

In the above aspect, the plurality of discontinuous portions may be a plurality of notch portions extended in an intersecting direction with the load input direction, and may be arranged along the load input direction.

In the above aspect, with a simple structure in which the plurality of notch portions is arranged along the load input direction, the variation range of the energy absorption characteristics due to the collision speed can be restrained to be small.

In the above aspect, the wall may have three or more layers laminated in the thickness direction, and the plurality of notch portions may be formed in an internal layer in the wall.

In the above aspect, since the notch portions forming the discontinuous portions are formed (placed) in the internal layer of the wall, an excellent appearance is achievable.

In the above aspect, the energy absorption member may be a crash box provided between a bumper reinforcement and a side member.

In the above aspect, when a collision load is input into the bumper reinforcement, the crash box is compressed between the bumper reinforcement and the side member. Since the plurality of discontinuous portions is formed on that wall of the crash box which extends in the load input direction, the variation range of the energy absorption characteristics due to the collision speed can be restrained to be small.

A second aspect of the present invention relates to an energy absorption member. The energy absorption member includes: a wall made of fiber reinforced resin and extending along a load input direction; and a plurality of discontinuous portions provided in at least part of the wall in its thickness direction and arranged along the load input direction. the plurality of discontinuous portions is discontinued from each other in the load input direction.

In the above aspect, when a collision load is input, the energy absorption member is compressed in the load input direction, so as to absorb collision energy. Since the plurality of discontinuous portions is formed on the wall of the energy absorption member so as to be arranged in the load input direction, energy absorption characteristics are hard to change due to a collision speed.

Thus, in the above aspect, a variation range of the energy absorption characteristics due to the collision speed can be restrained to be small.

As discussed above, the vehicle energy absorption structure and the energy absorption member according to the first and second embodiments of the present invention has an excellent effect of restraining the variation range of the energy absorption characteristics due to the collision speed to be small.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 3 is a sectional view illustrating, in an enlarged manner, part of a load stabilization structure formed in the crash box constituting the vehicle-body front structure according to the embodiment of the present invention;

DETAILED DESCRIPTION OF EMBODIMENTS

With reference to FIGS. 1 to 6, the following describes a vehicle-body front structure 10 to which a vehicle energy absorption structure according to an embodiment of the present invention is applied. Note that an arrow FR shown in each figure appropriately indicates a front side in a vehicle front-rear direction, and an arrow UP indicates an upper side in a vehicle up-down direction, and an arrow W indicates a vehicle width direction. Hereinafter, in a case where front and rear directions, and up and down directions are used without any special mention, they indicate front and rear in the vehicle front-rear direction, and up and down in the vehicle up-down direction.

[Basic Framework of Vehicle Body]

Figure 1:
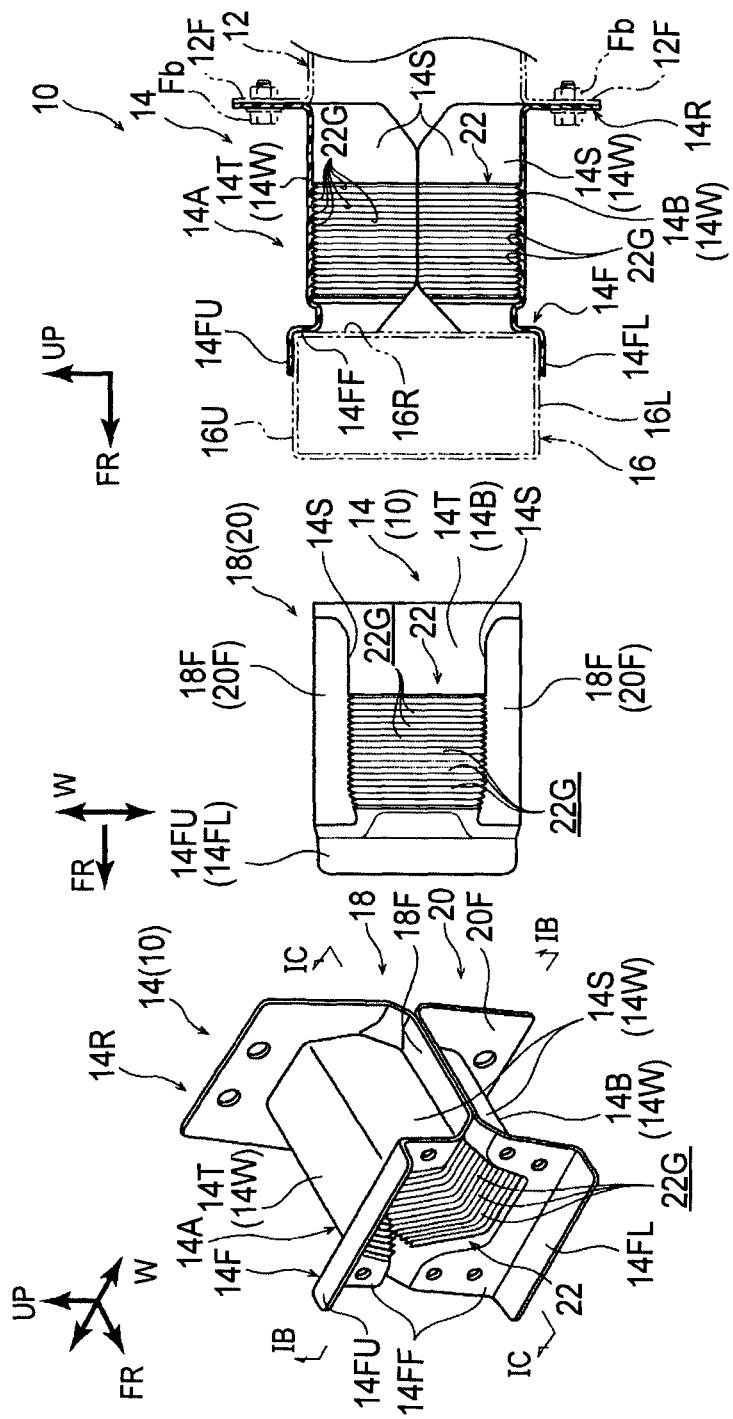
FIG. 1A is a perspective view illustrating a crash box constituting a vehicle-body front structure according to an embodiment of the present invention.
FIG. 1B is an exploded bottom plan view along a line IB-IB of FIG. 1A.
FIG. 1C is a sectional side view taken along a line IC-IC in FIG. 1A.
Figure 2:
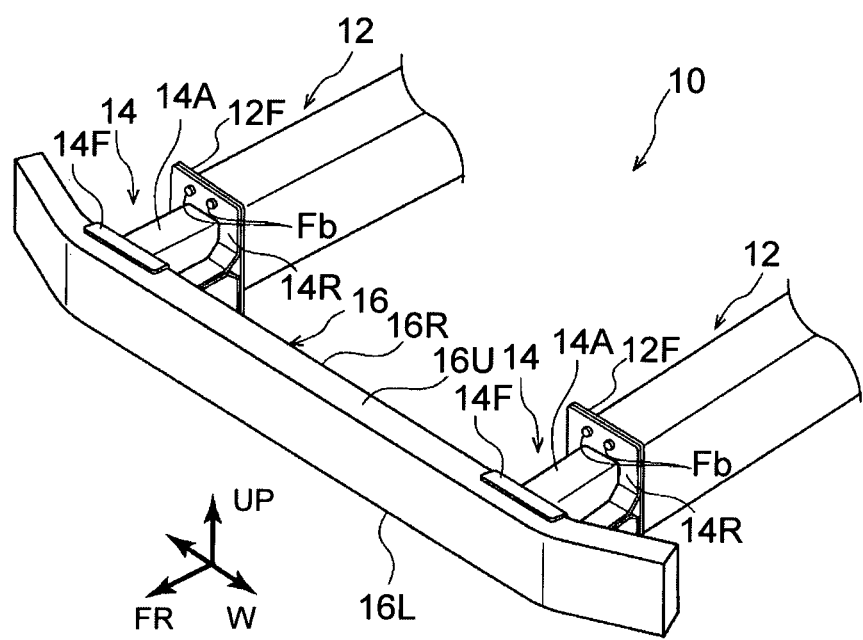
FIG. 2 is a perspective view illustrating a schematic overall configuration of the vehicle-body front structure according to the embodiment of the present invention.

FIG. 2 is a perspective view illustrating a schematic configuration of the vehicle-body front structure 10. As illustrated in this figure, the vehicle-body front structure 10 includes paired right and left front side members 12 arranged in the vehicle width direction with the front-rear direction being taken as their longitudinal direction. The right and left front side members 12 correspond to a side member in the present invention.

A crash box 14 as an energy absorption member is attached to a front end of the front side member 12. Further, a bumper reinforcement 16 is provided over front ends of the right and left crash boxes 14. In other words, the right and left front side members 12 are connected to the bumper reinforcement 16 via respective crash boxes 14. The bumper reinforcement 16 is made of a metal material such as aluminum or fiber reinforced resin such as CFRP, for example.

[Crash Box]

Next will be described a detailed configuration of the crash box 14. The crash box 14 is mainly constituted by an energy absorption portion 14A, a front flange 14F, and a rear flange 14R. The following first describes a material constituting the crash box 14, and then describes the energy absorption portion 14A, the front flange 14F, and the rear flange 14R in this order. After that, a load stabilization structure 22, which is a main part of the present embodiment and formed in the energy absorption portion 14A, will be described.

(Material)

The crash box 14, is made of carbon fiber reinforced plastic (hereinafter referred to as "CFRP") as the fiber reinforced resin. The CFRP in this embodiment is a composite material obtained by combining carbon fiber (e.g., carbon fiber of polyacrylonitrile (PAN)) as fiber and thermo plastic resin as matrix resin. By employing thermo plastic resin, it is possible to obtain the crash box 14 made of CFRP and excellent in recyclability with short cycle time.

Further, the CFRP in this embodiment is a unidirectional reinforcement (a so-called unidirectional material, a UD material) in which orientation directions of carbon fibers are uniform. The orientation directions of the carbon fibers in at least the energy absorption portion 14A of having a closed-section structure (described later) are along the front-rear direction. Accordingly, the crash box 14 is configured to generate a high load (reaction force) along with energy absorption, with respect to a collision load input along the front-rear direction.

(Energy Absorption Portion)

As illustrated in FIGS. 1A to 1C, the energy absorption portion 14A has a closed-section structure having a rectangular tubular shape with the front-rear direction being taken as an axial direction. More specifically, the energy absorption portion 14A includes a top wall 14T, a bottom wall 14B, and right and left side walls 14S, and forms a generally rectangular shape in a sectional view perpendicular to the axial direction.

In this embodiment, the crash box 14 including the energy absorption portion 14A is formed by joining an upper half 18 and a lower half 20 that form an upper and lower symmetrical shape. The upper half 18 includes the top wall 14T, upper parts of the right and left side walls 14S, and joint flanges 18F extended from bottom ends of the upper parts of the side walls 14S in the vehicle width direction. The upper half 18 has a hat shape that is opened downward in a sectional view perpendicular to the axial direction. The lower half 20 includes the bottom wall 14B, lower parts of the right and left side walls 14S, and joint flanges 20F extended from upper ends of the lower parts of the side walls 14S in the vehicle width direction. The lower half 20 has a hat shape that is opened upward in a sectional view perpendicular to the axial direction. Note that, in FIG. 1B illustrating the upper half 18, a reference sign of the lower half 20 forming an upper and lower symmetry with the upper half 18 is shown in a parenthesis.

The upper half 18 and the lower half 20 are joined to each other by joining the joint flanges 18F, 20F, so as to form the energy absorption portion 14A having the rectangular tubular shape. Note that the upper half 18 and the lower half 20 each having a hat-shaped section as described above are configured such that the upper parts and the lower parts of the side walls 14S are inclined so that opening widths of the upper half 18 and the lower half 20 along the vehicle width direction become larger than widths of the top wall 14T and the bottom wall 14B. In view of this, a sectional shape of the energy absorption portion 14A can be regarded as a hexagonal shape, more precisely.

Further, the joint flanges 18F, 20F are inclined so as to be distanced from each other on their front ends and rear ends, and those inclined parts serve as non-joining portions. The inclined parts are continuous with the front flange 14F and the rear flange 14R, which will be described later.

In the energy absorption portion 14A described above, the orientation directions of the carbon fibers in all parts (the top wall 14T, the bottom wall 14B, and the right and left side wall 14S) including the joint flanges 18F, 20F are along the front-rear direction.
(Front Flange)

The front flange 14F includes: a front wall 14FF projecting up-and-down and laterally from a front end of the energy absorption portion 14A including the joint flanges 18F, 20F; an upper wall 14FU extended forward from an upper end of the front wall 14FF; and a lower wall 14FL extended forward from a bottom end of the front wall 14FF.

The front wall 14FF abuts with a rear wall 16R of the bumper reinforcement 16, and is joined (connected) to the rear wall 16R with a fastener such as a bolt and a nut (not shown), or an adhesive. Further, the upper wall 14FU and the lower wall 14FL are joined (connected) to an upper wall 16U and a lower wall 16L of the bumper reinforcement 16 with adhesion or the like, for example.

An upper part of the front flange 14F, that is, an upper part of the front wall 14FF and the upper wall 14FU are formed in the upper half 18. Further, a lower part of the front flange 14F, that is, a lower part of the front wall 14FF and the lower wall 14FL are formed in the lower half 20.
(Rear Flange)

The rear flange 14R is formed as a backward wall projecting up-and-down and laterally from a rear end of the energy absorption portion 14A including the joint flanges 18F, 20F. The rear flange 14R abuts with a front flange 12F of the front side member 12, and is connected to the front flange 12F with a fastener Fb such as a bolt and a nut (see FIG. 1C, FIG. 2). An upper part of the rear flange 14R is formed in the upper half 18. Further, a lower part of the rear flange 14R is formed in the lower half 20.
(Load Stabilization Structure)

The energy absorption portion 14A of the crash box 14 is provided with the load stabilization structure 22 configured such that a plurality of discontinuous portions is arranged in the front-rear direction. More specifically, the load stabilization structure 22 is configured such that the discontinuous portions, that is, a plurality of grooves 22G as notch portions (notches) is arranged at a predetermined pitch (constant pitch) in the front-rear direction, on each wall constituting the energy absorption portion 14A.

Each of the grooves 22G is extended along a direction intersecting with (perpendicular to) the front-rear direction (so that a longitudinal direction thereof is along the intersecting direction). In this embodiment, the plurality of grooves 22G is formed on each of the top wall 14T, the bottom wall 14B, and the right and left side walls 14S. The grooves 22G formed on the top wall 14T and the bottom wall 14B extend along the vehicle width direction, and the grooves 22G formed on the right and left side walls 14S extend mainly along the up-down direction. Hereinafter, in a case where the top wall 14T, the bottom wall 14B, and the right and left side walls 14S are described collectively, they may be referred to as walls 14W.

As illustrated in FIG. 3 in an enlarged manner, the grooves 22G can be regarded as discontinuous portions that discontinue (separate) those parts (hereinafter referred to as "ridge portions 22N") between the grooves 22G on the wall 14W from each other in the front-rear direction, in part of the wall 14W in its thickness direction. Further, those parts of the walls 14W in which the grooves 22G are formed can be regarded as thinned parts relative to the ridge portions 22N. Further, the grooves 22G can be regarded as discontinuous portions of the carbon fibers oriented along the front-rear direction on the walls 14W.

The plurality of grooves 22G described above is formed except rear-end-side part of the walls 14W. Hereby, the crash box 14 is configured such that the strength of the rear end side thereof on which the grooves 22G are not formed (particularly, the strength in the vehicle width direction intersecting with the orientation directions of the carbon fibers) is set to be high relative to that part of the crash box 14 in which the grooves 22G are formed.

Further, in this embodiment, the plurality of grooves 22G constituting the load stabilization structure 22 is formed on an inner surface of the energy absorption portion 14A (each wall 14W of the energy absorption portion 14A) having a closed-section structure. Accordingly, the crash box 14 provided between the front side member 12 and the bumper reinforcement 16 is configured such that the load stabilization structure 22 is not exposed outside.

The load stabilization structure 22 described above is configured to contribute to restraining a collision-speed dependence of the energy absorption characteristics of the crash box 14 to be small. This point (an estimated mechanism) will be described later with an operation of the present embodiment.
[Operation]

Next will be described the operation of the embodiment.

When an automobile to which the vehicle-body front structure 10 is applied has a front end collision, a collision load is input into the crash box 14 from the bumper reinforcement 16. Then, the crash box 14 is compressed and deformed (smashed and broken), so that collision energy is partially absorbed due to the deformation.

In the vehicle-body front structure 10 according to the present embodiment, the load stabilization structure 22 is formed in the crash box 14. Accordingly, stable energy absorption characteristics can be obtained without depending on a collision speed. The following describes this point in comparison with a comparative example.

Comparative Example

Figure 5A:
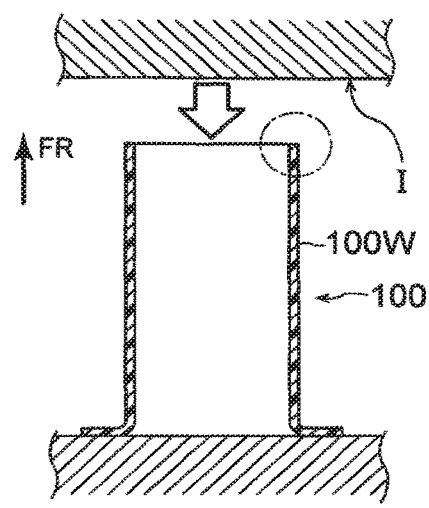
FIG. 5A is a sectional view illustrating an overall configuration of a crash box according to a comparative example relative to the embodiment of the present invention.
Figure 5B:
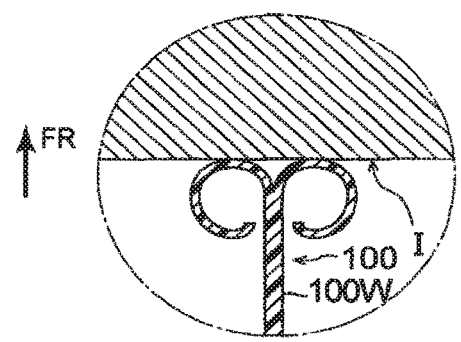
FIG. 5B is a sectional view schematically illustrating, in an enlarged manner, part of a broken state of the crash box according to the comparative example relative to the embodiment of the present invention.

As illustrated in FIG. 5A, a crash box 100 according to the comparative example is not provided with a load stabilization structure 22, and a wall 100W is flat both on front and back sides. In such a crash box 100, when a collision load is input from a collision object I, the wall is broken from its front side as illustrated in FIG. 5B, and an energy absorption load (a reaction force) is generated. Thus, collision energy (part of the collision energy) is absorbed.

Figure 6A:
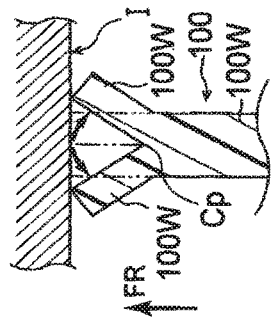
FIG. 6A is a view to describe a speed dependence occurring in energy absorption characteristics in the crash box according to the comparative example relative to the embodiment of the present invention, and is a sectional view illustrating a course of progression of breaking of the crash box in a chronological order.
Figure 6B:
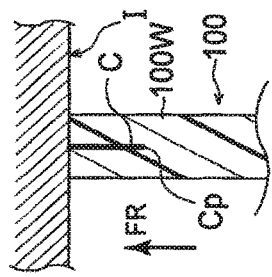
FIG. 6B is a view to describe a speed dependence occurring in energy absorption characteristics in the crash box according to the comparative example relative to the embodiment of the present invention, and is a sectional view illustrating a course of progression of breaking of the crash box in a chronological order.
Figure 6C:
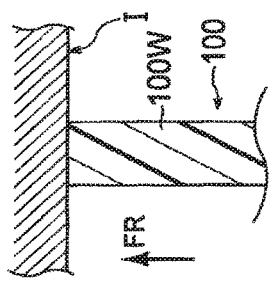
FIG. 6C is a view to describe a speed dependence occurring in energy absorption characteristics in the crash box according to the comparative example relative to the embodiment of the present invention, and is a sectional view illustrating a course of progression of breaking of the crash box in a chronological order.
Figure 6D:
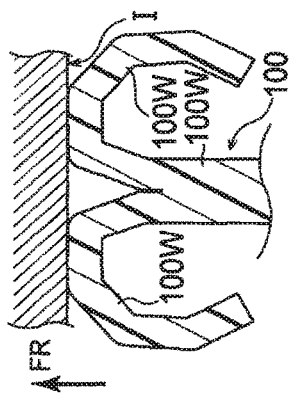
FIG. 6D is a view to describe a speed dependence occurring in energy absorption characteristics in the crash box according to the comparative example relative to the embodiment of the present invention, and is a sectional view illustrating a course of progression of breaking of the crash box in a chronological order.
Figure 6E:
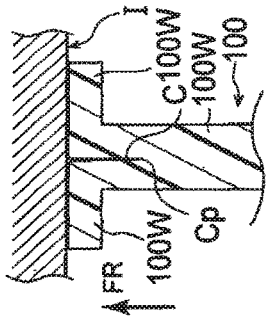
FIG. 6E is a view to describe a speed dependence occurring in energy absorption characteristics in the crash box according to the comparative example relative to the embodiment of the present invention, and is a sectional view illustrating a course of progression of breaking of the crash box in a chronological order.

The following describes an estimated mechanism of this broken mode. When a collision load is input into the wall 100W from the collision object I as illustrated in FIG. 6A, a crack C is formed in the wall 100W along a load input direction as illustrated in FIG. 6B. Subsequently, as illustrated in FIG. 6C, the wall 100W is bent so that the wall 100W is split toward both sides of the crack C with a tip Cp of the crack C being taken as a starting point. Further, as illustrated in FIG. 6D, when the bending is finished, a new crack C is formed in the wall 100W, and the wall 100W is split toward both sides of the crack C and bent. The splitting and bending are performed repeatedly, so that breaking of the wall 100W is progressed (see FIG. 6E).

Here, as the collision load is larger, a length of the crack C formed in the wall 100W is longer, and as a collision speed is higher, the collision load is larger if a collision counterpart is the same. Thus, the length of the crack C formed in the wall 100W depends on the collision speed. That is, it is estimated that the crack C is longer as the collision speed is higher. Accordingly, in the crash box 100, as the collision speed is higher, an energy absorption load to be generated is smaller.

Present Embodiment

In contrast, in the present embodiment, the plurality of grooves 22G is formed side by side in the load input direction on each of the walls 14W of the energy absorption portion 14A of the crash box 14. Accordingly, in the crash box 14, the wall 14W that receives a compressive load is deformed such that buckling, bending, and the like are repeated sequentially from a load-input-side groove 22G with the load-input-side groove 22G being taken as the starting point. This makes it possible to generate an energy absorption load that does not depend on the length of a crack C to be formed.

Further, as another mechanism of the present embodiment, such a mechanism is estimated that the plurality of grooves 22G serving as the discontinuous portions restrains proceedings of the crack C (the proceedings of the crack C stop at the grooves 22G or just before the grooves 22G), so that a crack C having a length that does not depend on the collision speed is generated. Even in this mechanism, the length of the crack C does not depend on the collision speed. Accordingly, it can be explained that an energy absorption load that is hard to depend on the collision speed is generated.

As such, in the vehicle-body front structure 10 according to the present embodiment, a variation range of the energy absorption characteristics due to the collision speed can be restrained to be small. In addition, in the present embodiment, the load stabilization structure 22 is formed in the crash box 14. Accordingly, even when an automobile to which the vehicle-body front structure 10 is applied has a front end collision, the variation range of the energy absorption characteristics due to the collision speed can be restrained to be small.

Further, in the vehicle-body front structure 10, with a simple structure in which the plurality of grooves 22G is arranged along the load input direction on each of the walls 14W constituting the crash box 14, the variation range of the energy absorption characteristics due to the collision speed can be restrained to be small.

Further, in the vehicle-body front structure 10, the grooves 22G are formed on an inner side of the crash box 14 having a closed-section structure. Accordingly, the grooves 22G are not seen from a user or the like, so that an excellent appearance can be achieved. Further, it is possible to restrain foreign substances from getting into the grooves 22G.

Still further, the crash box 14 is configured such that the load stabilization structure 22 is not formed on the rear end side of the energy absorption portion 14A. Consequently, the strength to a load in the vehicle width direction is higher than a configuration in which the load stabilization structure 22 is formed over an entire length of the energy absorption portion 14A. Accordingly, in a case of a small overlap collision in which an overlap with the bumper reinforcement 16 is small or an oblique collision in which a collision occurs from a diagonal direction, it is possible to restrain the crash box 14 from being broken on the rear end side. Accordingly, even in a case of the small overlap collision and the oblique collision, the crash box 14 is compressed and deformed sequentially from its front end side, thereby making it possible to achieve energy absorption by the crash box 14.

[Modifications]

The above embodiment deals with an example in which the plurality of grooves 22G extending in the up-down direction and in the vehicle width direction, which are directions intersecting with the load input direction (the front-rear direction) is arranged along the load input direction so as to form the load stabilization structure 22. However, the present invention is not limited to this. The load stabilization structure may be formed in at least part of each wall of the crash box 14 in a thickness direction such that a plurality of discontinuous portions that is discontinuous from each other in the load input direction is arranged along the load input direction. As modifications, structures of FIGS. 4A to 4C are described.

(First Modification)

Figure 4A:
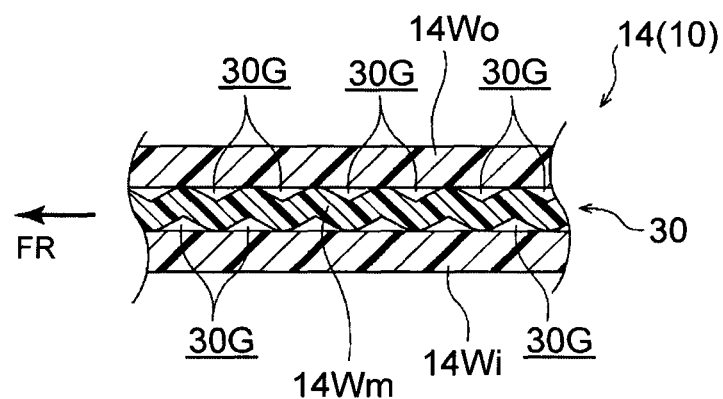
FIG. 4A is a sectional view of a first modification, schematically illustrating a modification of the load stabilization structure constituting the vehicle-body front structure according to the embodiment of the present invention.
Figure 4B:
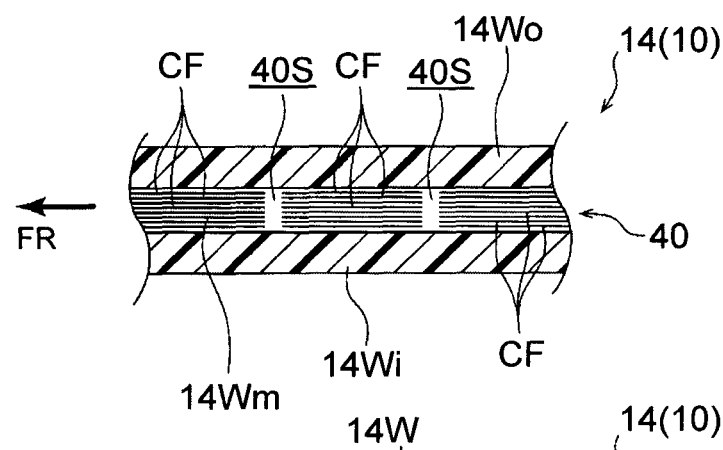
FIG. 4B is a sectional view of a second modification, schematically illustrating a modification of the load stabilization structure constituting the vehicle-body front structure according to the embodiment of the present invention.
Figure 4C:
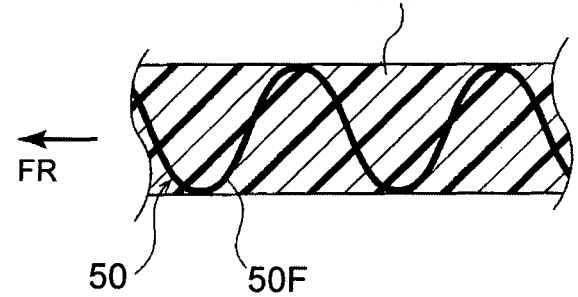
FIG. 4C is a sectional view of a third modification, schematically illustrating a modification of the load stabilization structure constituting the vehicle-body front structure according to the embodiment of the present invention.

FIG. 4A illustrates a load stabilization structure 30 according to a first modification. A wall 14W of a crash box 14 provided with a load stabilization structure 30 has a laminated structure. In this embodiment, three layers, i.e., an outer layer 14Wo, an intermediate layer 14Wm, and an inner layer 14Wi are laminated from an outside (an outer peripheral side) of an energy absorption portion 14A of a closed-section structure toward an inside (an inner peripheral side) thereof.

The load stabilization structure 30 is formed in the intermediate layer 14Wm of the wall 14W. The load stabilization structure 30 is configured such that discontinuous portions, that is, a plurality of grooves 30G as notch portions (notches) is arranged at a predetermined pitch (a constant pitch) in the front-rear direction.

Each of the grooves 30G extends in a direction intersecting with (perpendicular to) the front-rear direction (with the intersecting direction being taken as its longitudinal direction). The grooves 30G formed on a top wall 14T and a bottom wall 14B extend along the vehicle width direction, and the grooves 30G formed on right and left side walls 14S extend mainly along the up-down direction. The grooves 30G are formed on opposite sides of each wall 14W in its thickness direction, and respective grooves 30G on the opposite sides in the thickness direction are placed at different positions in the front-rear direction.

In this embodiment, the grooves 30G on the opposite sides in the thickness direction are formed alternately from the front side toward the rear side, so that each intermediate layer 14Wm has a corrugated plate shape with its thickness direction being taken as an amplitude direction. The grooves 30G may be formed by performing machining on CFRP, or may be formed by bending a CFRP sheet (prepreg) alternately in a corrugated plate shape.

Those parts between the grooves 30G on the wall 14W as each wall can be regarded as discontinuous portions that are discontinuous (separated) from each other in the front-rear direction, in part of the wall 14W in the thickness direction.

The crash box 14 provided with the load stabilization structure 30 according to the first modification and a vehicle-body front structure 10 including the crash box 14 can yield the same operation and effect as in the above embodiment. An estimated mechanism of a breaking mode in the first modification is supplemented as follows. When a collision load is input into the crash box 14, a crack C is formed in the wall 14W, but a starting point of bending (buckling) of the wall is placed at a position of the groove 30G. Further, similarly to the above embodiment, such a mechanism can be also estimated that the plurality of grooves 30G serving as the discontinuous portions restrains proceedings of the crack C (the proceedings of the crack C stop at the grooves 30G or just before the grooves 30G). In any mechanism, the crash box 14 provided with the load stabilization structure 30 can generate an energy absorption load that is hard to depend on a collision speed.

Further, in the first modification, since the load stabilization structure 30 is formed in the intermediate layer 14Wm, the load stabilization structure 30 cannot be seen in a single-body state of the crash box 14 (before installation to a vehicle body). Accordingly, the crash box 14 has a good appearance. Note that the whole wall 14W may be formed in a corrugated plate shape like the intermediate layer 14Wm.

(Second Modification)

FIG. 4B illustrates a load stabilization structure 40 according to a second modification. The load stabilization structure 40 is formed in an intermediate layer 14Wm, that is, an internal layer in a wall 14W having a laminated structure including three or more layers. More specifically, the load stabilization structure 40 is configured such that a plurality of slits 40S as discontinuous portions is arranged at a predetermined pitch in the front-rear direction. Each of the slits 40S extends along a direction intersecting with (perpendicular to) the front-rear direction. That is, the slits 40S formed on a top wall 14T and a bottom wall 14B extend along the vehicle width direction, and the slits 40S formed on right and left side walls 14S extend mainly along the up-down direction.

Each of the slits 40S is formed as a discontinuous portion of carbon fibers CF constituting CFRP. Note that, in the intermediate layer 14Wm in FIG. 4B, the carbon fibers CF (orientation directions thereof) are schematically illustrated instead of resin hatching. Here, the slits 40S may be formed such that short fibers having the same length are oriented at a constant pitch in the front-rear direction, or may be formed by cutting long fibers oriented along the front-rear direction. In the example illustrated herein, the slits 40S are formed over an entire thickness of the intermediate layer 14Wm, but the slits 40S may be formed partially in the thickness direction.

A crash box 14 provided with the load stabilization structure 40 according to the second modification and a vehicle-body front structure 10 including the crash box 14 also can yield the same operation and effect as in the above embodiment. An estimated mechanism of a breaking mode in the second modification is supplemented as follows. When a collision load is input into the crash box 14, a crack C is formed in the wall 14W. Since the slits 40S are formed in the wall 14W (the intermediate layer 14Wm of the wall 14W), transmission of the load is interrupted by the slits 40S in the fibers of the CFRP. Because of this, a position of a tip Cp of the crack C formed in the wall 14W coincides with a position where the slit 40S is formed, so that a length of the crack C is generally uniform without depending on a collision speed.

That is, it is estimated that the plurality of slits 40S serving as the discontinuous portions restrains proceedings of the crack C (the proceedings of the crack C stop at the slits 40S), so that the crack C having a length that does not depend on the collision speed is generated. Thus, since the length of the crack C does not depend on the collision speed, it can be explained that an energy absorption load that is hard to depend on the collision speed is generated. An effect obtained by the load stabilization structure 40 being formed in the intermediate layer 14Wm is the same as the first modification.

(Third Modification)

FIG. 4C illustrates a load stabilization structure 50 according to a third modification. In the load stabilization structure 50, a discontinuous portion is formed by a carbon fiber constituting CFRP. More specifically, in addition to carbon fibers (not shown) oriented in a wall 14W along the front-rear direction, a carbon fiber 50F having a sine wave (winding path) shape with a thickness direction of the wall 14W being taken as an amplitude direction is oriented in the wall 14W. In the example illustrated herein, a thickness of the wall 14W is generally the same as a peak-to-peak amplitude of the carbon fiber 50F. However, the peak-to-peak amplitude of the carbon fiber 50F may be smaller than the thickness of the wall 14W. The carbon fiber 50F forms a discontinuous portion at a part where the carbon fiber 50F crosses the wall 14W in the thickness direction, such that front and rear parts across the crossing part are discontinued from each other.

A crash box 14 provided with the load stabilization structure 50 according to the third modification and a vehicle-body front structure 10 including the crash box 14 also can yield the same operation and effect as in the above embodiment. An estimated mechanism of a breaking mode in the third modification is supplemented as follows. When a collision load is input into the crash box 14, a crack C is formed in the wall 14W. Since the carbon fiber 50F is oriented in a sine wave shape in the wall 14W (the intermediate layer 14Wm of the wall 14W), proceedings of the crack C stop at the part where the carbon fiber 50F crosses the wall 14W.

Accordingly, a length of the crack C formed in the wall 14W is generally uniform at a half cycle of the carbon fiber 50F having a sine wave shape. Thus, since the length of the crack C does not depend on a collision speed, it can be explained that an energy absorption load that is hard to depend on the collision speed is generated.

(Definition of Discontinuous Portion)

As described above, the discontinuous portion in the present invention may be a deformation starting point portion (a weakening portion, a low strength portion, or the like) serving as a starting point of bending or buckling relative to a collision load. Further, the discontinuous portion in the present invention may be a crack controlling portion that controls a crack C (a length of the crack C, a position of a tip Cp of the crack C) (or stops proceedings of the crack C). Further, the discontinuous portion in the present invention may have both a function of the deformation starting point portion and a function of the crack controlling portion.

(Other Modifications)

Note that the above embodiment and each of the modifications deal with an example in which the CFRP constituting the wall 14W is a unidirectional reinforcement in which fibers are oriented uniformly. However, the present invention is not limited to this. The orientation directions of the fibers in the wall 14W or each layer constituting the wall 14W are not limited. For example, the wall 14W or the layer constituting the wall 14W may be made of a pseudo isotropic material (a so-called QI material). A supplementary explanation is made as follows. That is, the wall 14W made of the pseudo isotropic material also has a speed dependence of energy absorption characteristics, although the speed dependence is smaller than the speed dependence of the energy absorption characteristics of the wall 14W made of the unidirectional reinforcement. Accordingly, when the configuration of the present invention is applied to the wall 14W (the crash box 14) made of the pseudo isotropic material, it is possible to solve the problem of the present invention. Further, it goes without saying that, in the configuration in which the wall 14W has a laminated structure, respective layers may have different fiber orientations.

Further, the above embodiment and each of the modifications deal with an example in which thermo plastic resin is employed as the resin constituting the CFRP, but the present invention is not limited to this. For example, thermo setting resin may be employed as the resin constituting the CFRP.

Further, the above embodiment and each of the modifications deal with an example in which the CFRP is employed as the fiber reinforced resin. However, the present invention is not limited to this. Various fibers can be employed as the fibers constituting the fiber reinforced resin, and a glass fiber, a kevlar fiber, or the like may be employed. In the configuration in which the wall 14W has a laminated structure, different fibers may be used for respective layers. In the third modification, a fiber for the fiber 50F in a sine wave shape may be a fiber of a type different from a fiber used for the fiber reinforced resin.

Furthermore, the above embodiment and each of the modifications deal with an example in which the energy absorption portion 14A of the crash box 14 has a closed-section structure. However, the present invention is not limited to this. For example, the energy absorption portion 14A may have an open sectional shape having a corrugated plate shape when viewed from the load input direction. Further, the above embodiment and the first modification deal with an example in which the grooves 22G, 30G are formed as the discontinuous portions, and the notch portions. However, the present invention is not limited to this. For example, as the notch portions, a plurality of recessed portions may be placed intermittently along a direction intersecting with the load input direction. In this case, the notch portions (a set of the recessed portions) adjacent to each other in the load input direction may be configured such that the recessed portions are placed at the same position or different positions in the intersecting direction.

Further, the above embodiment and each of the modifications deal with an example in which the vehicle energy absorption structure according to the present invention is applied to the vehicle-body front structure 10. However, the present invention is not limited to this. For example, the present invention may be applied to a vehicle-body rear structure in which a crash box is provided between a rear side member and a rear bumper reinforcement. Further, the energy absorption member according to the present invention is not limited to the crash box, but the present invention can be applied to various energy absorption members including an energy absorption member placed in a closed section of a rocker or on an outer side of the rocker in the vehicle width direction.

In addition, it goes without saying that the present invention can be performed with various modifications without departing from a gist of the present invention. For example, the configurations (elements) of the modifications may be combined appropriately to form a reinforcement structure.

What is claimed is:

1. A vehicle energy absorption structure comprising:
an energy absorption member having a wall made of fiber reinforced resin, wherein:
at least part of the wall extending in a load input direction of the energy absorption member is provided with a plurality of notch portions spaced from each other in the load input direction, the plurality of notch portions being arranged along the load input direction and formed on an inner surface of the wall having a closed-section structure such that a thickness of the wall at locations of the notch portions is different than the thickness of the wall at locations other than the notch portions as measured along a thickness direction that is perpendicular to the load input direction.

2. The vehicle energy absorption structure according to claim 1, wherein:
the energy absorption member is a crash box provided between a bumper reinforcement and a side member.

3. An energy absorption member comprising:
a wall made of fiber reinforced resin and extending along a load input direction; and
a plurality of notch portions provided in at least part of the wall and arranged along the load input direction, the plurality of notch portions being spaced from each other in the load input direction and formed on an inner surface of the wall having a closed-section structure such that a thickness of the wall at locations of the notch portions is different than the thickness of the wall at locations other than the notch portions as measured along a thickness direction that is perpendicular to the load input direction.

* * * * *